(12) United States Patent
Bryant et al.

(10) Patent No.: US 12,371,145 B2
(45) Date of Patent: Jul. 29, 2025

(54) DUCT STRINGER ASSEMBLY WITH BULKHEAD

(71) Applicant: Airbus Operations Limited, Bristol (GB)

(72) Inventors: Anthony Bryant, Bristol (GB); Peter Muscat, Bristol (GB)

(73) Assignee: Airbus Operations Limited, Bristol (GB)

( * ) Notice: Subject to any disclaimer, the term of this patent is extended or adjusted under 35 U.S.C. 154(b) by 52 days.

(21) Appl. No.: 17/838,355

(22) Filed: Jun. 13, 2022

(65) Prior Publication Data

US 2022/0380019 A1 Dec. 1, 2022

Related U.S. Application Data

(63) Continuation of application No. PCT/EP2020/086140, filed on Dec. 15, 2020.

(30) Foreign Application Priority Data

Dec. 19, 2019 (GB) .................................... 1918866

(51) Int. Cl.
| | | |
|---|---|---|
| *B64C 3/18* | (2006.01) | |
| *B64C 3/34* | (2006.01) | |
| *B64D 37/06* | (2006.01) | |
| *B64F 5/10* | (2017.01) | |
| *F16L 55/11* | (2006.01) | |
| *F16L 55/132* | (2006.01) | |

(52) U.S. Cl.
CPC ................ *B64C 3/182* (2013.01); *B64C 3/34* (2013.01); *B64F 5/10* (2017.01); *F16L 55/11* (2013.01); *F16L 55/132* (2013.01); *B64D 37/06* (2013.01)

(58) Field of Classification Search
CPC ........... B64C 3/182; B64C 3/34; B64D 37/08; B64D 37/10; F16L 44/11; F16L 44/132; F16L 55/11; F16L 55/132
See application file for complete search history.

(56) References Cited

U.S. PATENT DOCUMENTS

| | | | |
|---|---|---|---|
| 4,739,899 A | 4/1988 | Thompson et al. | |
| 8,167,245 B1* | 5/2012 | Koehler | B64C 3/34 |
| | | | 244/135 R |
| 9,010,689 B1* | 4/2015 | Brook | B64D 37/32 |
| | | | 244/135 R |
| 2013/0316147 A1 | 11/2013 | Douglas et al. | |

(Continued)

FOREIGN PATENT DOCUMENTS

| | | | |
|---|---|---|---|
| DE | 198 16 253 A1 | 10/1999 | |
| GB | 2117863 A | * 10/1983 | ............ F16L 55/132 |

OTHER PUBLICATIONS

International Search Report and Written Opinion for Application No. PCT/EP2020/086140 dated Feb. 8, 2021.

*Primary Examiner* — Joshua D Huson
*Assistant Examiner* — Anna L. Gordon
(74) *Attorney, Agent, or Firm* — KDW Firm PLLC

(57) ABSTRACT

A duct stringer assembly with a bulkhead. The duct stringer assembly has duct walls providing a duct with a closed cross-section. The duct is adapted to transport fluid. A bulkhead is in the duct, and the bulkhead is adapted to block the flow of fluid along the duct. The bulkhead has a bulkhead body, and a gasket sealing a gap between the bulkhead body and the duct walls.

20 Claims, 7 Drawing Sheets

(56) References Cited

U.S. PATENT DOCUMENTS

| | | | |
|---|---|---|---|
| 2015/0239570 A1 | 8/2015 | Brook et al. | |
| 2015/0336656 A1* | 11/2015 | Rolfes | B64C 3/34 |
| | | | 244/123.1 |
| 2016/0052617 A1* | 2/2016 | Rolfes | B64D 37/10 |
| | | | 244/119 |
| 2016/0355273 A1* | 12/2016 | Perez Diaz | B64C 3/34 |
| 2021/0122455 A1* | 4/2021 | Hanson | B64F 5/10 |

* cited by examiner

DUCT STRINGER ASSEMBLY WITH BULKHEAD

CROSS-REFERENCE TO RELATED APPLICATIONS

This application is a continuation of and claims priority to PCT/EP2020/086140 filed Dec. 15, 2020, which claims priority to UK Patent Application No. GB 1918866.3 filed Dec. 19, 2019, the entire disclosures of which are incorporated by reference herein.

TECHNICAL FIELD

The disclosure herein relates to a duct stringer assembly adapted to transport fluid. The disclosure herein also relates to a duct stringer bulkhead, an aircraft and a method of assembling a duct stringer assembly.

BACKGROUND

Stringers are known that are adapted to transport fluid in an aircraft wing. For example, US 2013/0316147 discloses a stringer adapted to transport fluid in an aircraft wing. The stringer may be adapted to provide venting to one or more fuel tanks in the aircraft wing, or it may be adapted to provide fuel to the one or more fuel tanks. A downpipe is provided for providing a fluidic connection between the stringer and a fuel tank.

A vent dam for use in a vent stringer in a fuel vent system is known from US 2015/0239570. The vent dam is configured to mount to and within the vent stringer. The vent dam has a contoured guiding surface for guiding fuel flow into and out of an interior of the vent stringer. The vent dam, the vent stringer, and a tube attached to the vent stringer are in fluid communication with one or more fuel tanks. The vent dam further has one or more side flanges extending from the contoured guiding surface for providing attachment of the vent dam to one or more interior portions of the vent stringer. The contoured guiding surface and the one or more side flanges are formed as one piece. The one or more side flanges may be mechanically attached to the vent stringer via one or more fastener elements. In another embodiment, the one or more side flanges may be bonded or adhered to the vent stringer via a bonding agent. In an embodiment, a two piece vent dam design is inserted through an access opening of the vent stringer.

SUMMARY

According to a first aspect of the disclosure herein, a duct stringer assembly comprises duct walls providing a duct with a closed cross-section, wherein the duct is adapted to transport fluid; and a bulkhead in the duct, wherein the bulkhead is adapted to block the flow of fluid along the duct; the bulkhead comprising a bulkhead body, and a gasket sealing a gap between the bulkhead body and the duct walls.

With the above arrangement it is possible to accommodate tolerance build up during manufacture and assembly. With composite components increasingly being used in aircraft assemblies, for example, it is possible that a greater tolerance build up will occur. Through use of a body together with a gasket it is possible to accommodate tolerance build up. As such the need to undertake tolerance control is reduced.

The use of a gasket reduces or eliminates any need for curable sealant material to be introduced around the bulkhead body. This may aid manufacturing complexity and time.

The gasket may be compressed between the bulkhead body and the duct walls.

The gasket may include an elastomeric material.

The duct stringer assembly may comprise a releasable mechanical fixing between the bulkhead body and the duct walls. As such, the bulkhead may be removable from the duct during maintenance. This will allow ease of access to the duct on both sides of the bulkhead.

The mechanical fixing arrangement may comprise a plurality of fasteners. The plurality of fasteners may extend through the duct walls into the bulkhead body. As such, the fasteners are easily accessible during assembly and/or maintenance.

The duct stringer assembly may comprise a vent opening in at least one of the duct walls having a vent opening edge. The bulkhead body is adapted to be insertable through the vent opening. As such assembly of the aircraft assembly may be simplified.

The bulkhead may be adapted to block the flow of fluid along the duct at one end of the vent opening.

The bulkhead may comprise a shoulder located with the vent opening edge to locate the bulkhead. As such, the assembly process may be simplified. A straightforward way of ensuring that the bulkhead is correctly aligned in the duct is provided.

A bridge may be disposed over at least part of the vent opening edge. The bridge may locate against the bulkhead. The bridge may abut the shoulder. The bridge may act as a mechanical fixing between the bulkhead and the duct walls. Fasteners may mount the bridge to the duct walls. Fasteners may mount the bridge to the bulkhead, for example the shoulder.

The shoulder may protrude from the bulkhead body.

The gasket may be a compressible seal. The gasket may comprise an o-ring. The shape may be, for example, one of circular, a D-ring, a quad-ring.

The gasket may be a first gasket and the bulkhead may comprise a second gasket.

The bulkhead body may comprise a circumferentially extending surface, and a section of the gasket may protrude from the surface.

The bulkhead body may comprise two opposing sides of the circumferentially extending surface which are chamfered in opposing directions. Diagonally opposing edges may be chamfered. The edges of the bulkhead body are configured to provide for the bulkhead body to rotate in the duct during insertion of the bulkhead into its assembled position in the duct.

The bulkhead body may comprise a circumferentially extending flange forming the circumferentially extending surface. The bulkhead body may comprise a first portion and a second portion, and wherein at least an inner side of the gasket may be at least partially received between the first and second portions.

At least the inner side of the gasket may be compressed to cause an outer side of the gasket to be distended away from the bulkhead body.

The second portion may be adapted to move relative to the first portion to compress the at least inner side of the gasket to adjust the distension of the gasket.

The duct stringer assembly may comprise an axial clamping mechanism arranged to clamp the gasket between the first and second portions. The axial clamping mechanism may be a threaded bolt and receiving bore arrangement.

The bulkhead may divide the duct into a first portion on a first side of the bulkhead and a second portion on a second side of the bulkhead; and the first portion may be adapted to transport fluid via an interconnecting pipe at the vent opening.

The duct stringer assembly may further comprise a skin, wherein the duct is adhered to the skin.

According to an aspect of the disclosure herein, there is provided a duct stringer bulkhead adapted to block the flow of fluid along a duct, the bulkhead comprising a bulkhead body; and a gasket extending circumferentially around the bulkhead body.

The duct stringer bulkhead may comprise fixings configured to fix the bulkhead in a duct.

According to an aspect of the disclosure herein, there is provided a structure comprising a skin; a duct stringer adhered to the skin; and a duct stringer bulkhead as described above, wherein the duct stringer bulkhead is located in the duct stringer with the gasket sealing a gap between the duct stringer bulkhead and the duct stringer.

According to an aspect of the disclosure herein, there is provided an aircraft comprising a duct stringer assembly as described above.

According to an aspect of the disclosure herein, there is provided a method of assembling a duct stringer assembly, the method comprising: forming duct walls, wherein the duct walls provide a duct with a closed cross-section, and the duct is adapted to transport fluid; providing a vent opening in the duct wall; and, after the duct walls have been formed, inserting a bulkhead having a bulkhead body and a gasket in the duct through the vent opening; and locating the bulkhead so that the gasket seals a gap between the bulkhead body and the duct walls to block the flow of fluid along the duct.

The duct walls may be formed by curing a fiber-reinforced composite material.

The duct walls may be formed by co-curing. Co-curing is when the adhesive and the adherends have been cured together in a single curing process. The co-cured assembly may be formed by providing parts of the duct as un-cured parts and then curing them in contact with each other. Optionally the duct stringer is made of composite material, such as a fiber-reinforced composite material.

Duct walls may be formed from a duct stringer. Optionally the duct stringer comprises: a structural member with a hat-shaped cross-section, the structural member comprising a crown, a pair of webs and a pair of feet; and a duct member adhered to the crown and to opposed inner faces of the webs, wherein the duct walls are provided by the duct member.

Optionally the bulkhead divides the duct into a first portion on a first side of the bulkhead and a second portion on a second side of the bulkhead. Optionally the first portion is adapted to transport fluid via an interconnecting pipe.

Optionally the first portion is adapted to transport fluid; and the second portion is not adapted to transport fluid.

Optionally the bulkhead is distended to the duct walls around a full periphery of the bulkhead, so that the bulkhead substantially prevents the flow of fluid between the first and second portions of the duct.

Optionally the duct is in fluid communication with a tank, such as a fuel tank or surge tank, via an interconnecting pipe.

The fluid transported by the duct may be air, fuel, or any other fluid.

The duct stringer may be adhered to a skin to form a structure such as a stiffened panel structure. The skin may be a skin of a vehicle such as a boat or aircraft. For instance, the skin may be a boat hull, an aircraft wing skin or an aircraft fuselage skin.

Optionally the skin is made of a composite material, such as a fiber-reinforced composite material.

Optionally the duct stringer is adhered to the skin by one or more co-cured or co-bonded joints.

According to an aspect of the disclosure herein there is provided a fuel system comprising a first tank; a second tank; and a duct stringer assembly as described above, wherein the duct is in fluid communication with the first and second tanks. Optionally the first tank is a fuel tank, and the second tank is a surge tank. Optionally one or both of the tanks are in an aircraft wing. Optionally the duct is in fluid communication with the first or second tank via an interconnecting pipe.

Optionally the bulkhead divides the duct into a first portion on a first side of the bulkhead which is in fluid communication with the first and second tanks; and a second portion on a second side of the bulkhead, which may not be adapted to transport fluid.

BRIEF DESCRIPTION OF THE DRAWINGS

Embodiments of the disclosure herein will now be described with reference to the accompanying drawings, in which.

DETAILED DESCRIPTION

Figure 1:
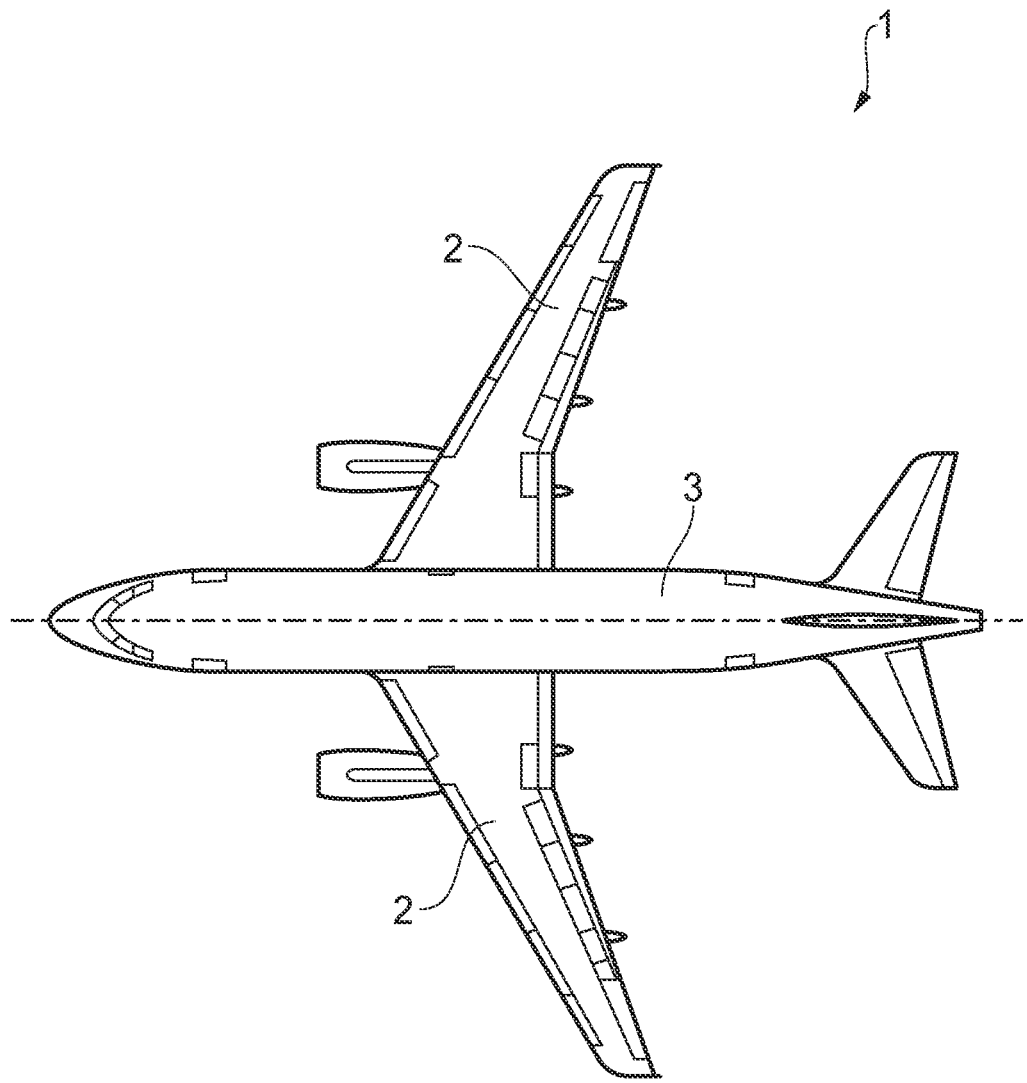
FIG. 1 is a plan view of an aircraft.
Figure 2:
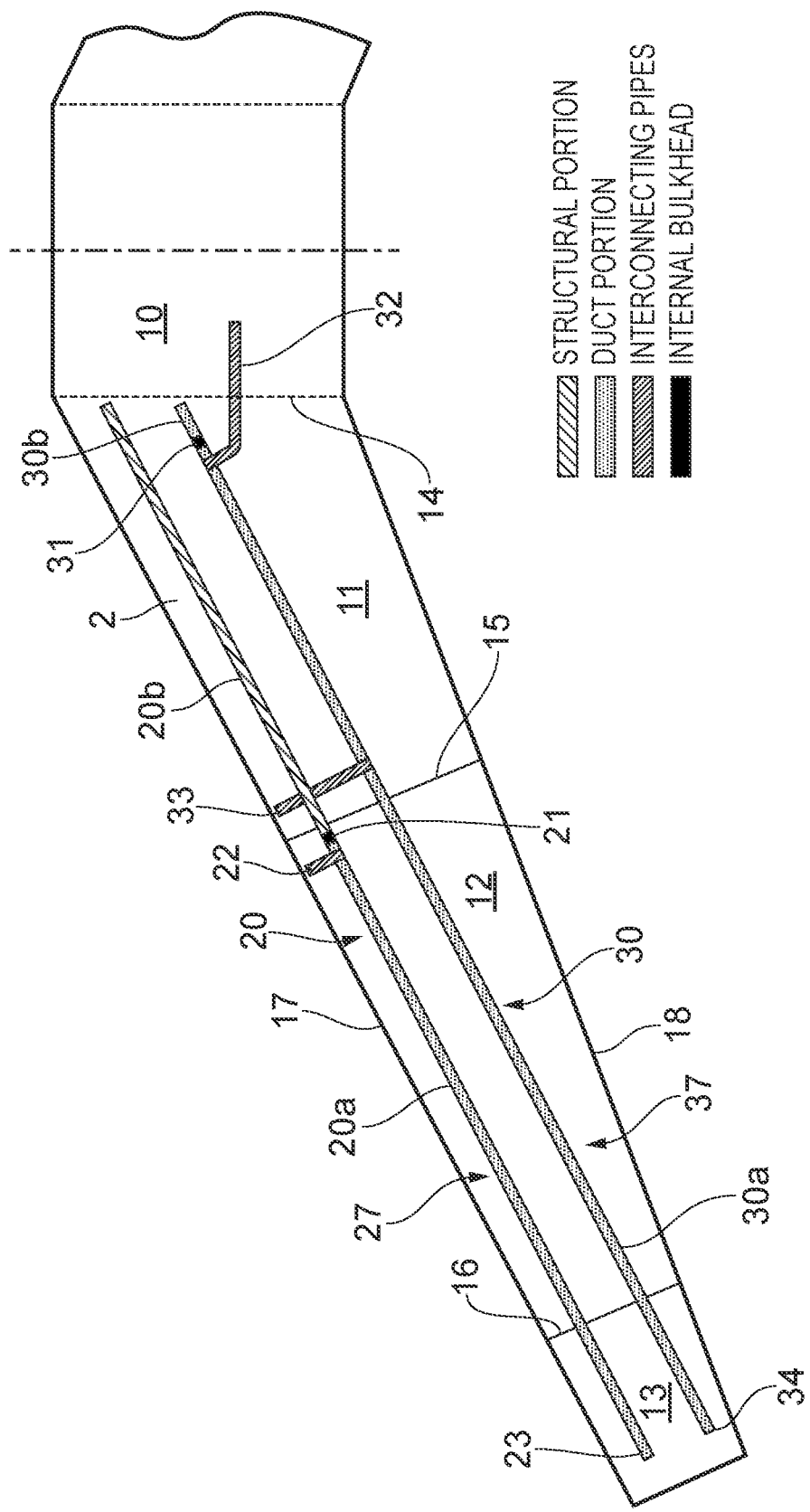
FIG. 2 is a plan view of the aircraft's fuel tank system with duct stringer assemblies.

FIG. 1 is a plan view of an aircraft 1 comprising a pair of wings 2 and a fuselage 3. FIG. 2 is a plan view of certain elements of the aircraft's fuel tank system, including a center fuel tank 10 inside the fuselage, and wing tanks 11-13 inside the wing 2. The wing tanks comprise an inboard fuel tank 11, an outboard fuel tank 12 and a surge tank 13. The tanks 10-13 are separated by ribs 14-16.

The wing tanks 11-13 are bounded fore and aft by spars 17, 18. The upper and lower boundaries of the wing tanks 11-13 are provided by upper and lower wing skins, not shown in FIG. 1. Each wing skin is stiffened by stringers running span-wise along the length of the wing. Two of the stringers attached to the upper wing skin are so-called "duct stringers" 20, 30 which are shown in FIG. 2. The other stringers attached to the upper wing skin are not shown in order to simplify the drawing.

Each duct stringer 20, 30 includes a duct portion 20a, 30a outboard of an internal bulkhead 21, 31; and a structural portion 20b, 30b inboard of the internal bulkhead 21, 31. The duct portion 20a, 30a of each duct stringer 20, 30 is able to act as both a structural member and a duct member. Each duct stringer 20, 30 and bulkhead 21, 31 forms part of a duct stringer assembly 27, 37.

The duct portion 20a of the duct stringer 20 is in fluid communication with the outboard fuel tank 12 via an interconnecting pipe 22 and with the surge tank 13 via an outlet 23 at the end of the stringer 20. The duct portion 30a of the duct stringer 30 is in fluid communication with the inboard fuel tank 11 via an interconnecting pipe 33 and with the surge tank 13 via an outlet 34 at the end of the stringer 30. The duct portion 30a of the duct stringer 30 is also in fluid communication with the center fuel tank 10 via an interconnecting pipe 32. Optionally, the distal end of each interconnecting pipe 22, 32, 33 is fitted with a bell mouth or float valve, not shown.

During operation of the aircraft, the duct stringers 20, 30 are used to transport air in either direction between the surge tank 13 and the fuel tanks 10-13 in order to manage the air pressure within the tanks. So each duct stringer 20, 30 has two functions: stiffening the upper wing skin; and providing a duct which transports air to and from the surge tank 13. Although used to transport air, it will be understood that alternative configurations of a duct stringer are envisaged, and that such a duct may be configured to carry different fluids, including different liquids and gases.

Figure 3:
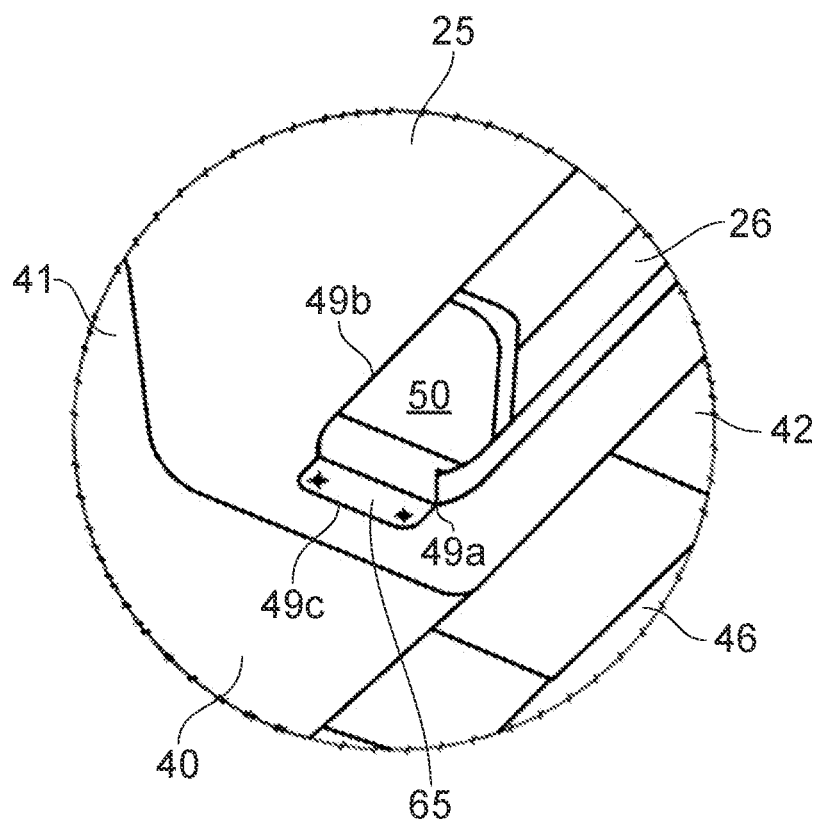
FIG. 3 is a perspective view of part of one of the duct stringer assemblies with a duct stringer and a bulkhead.
Figure 4:
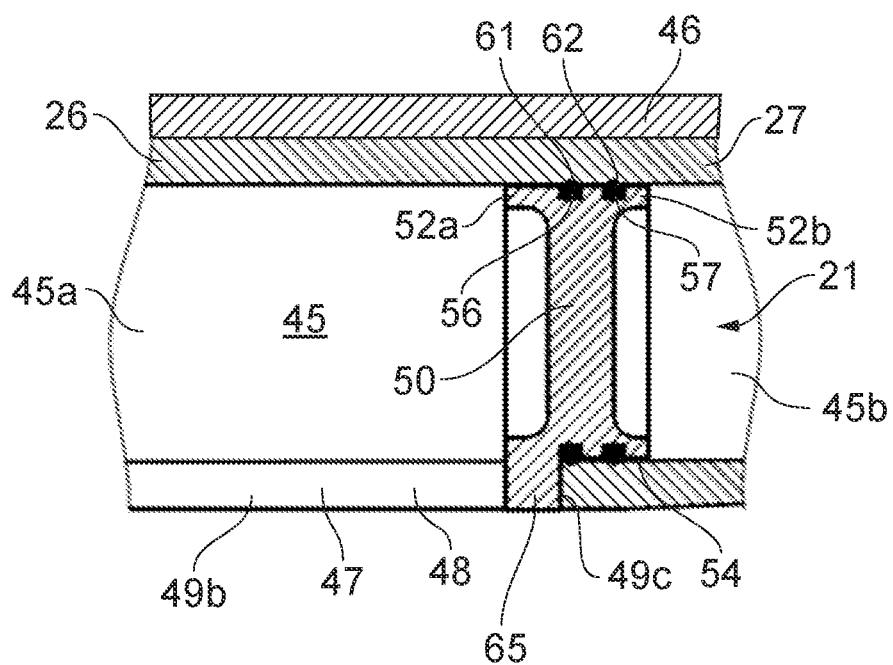
FIG. 4 is a transverse cross-sectional view across one of the duct stringer assemblies.
Figure 5:
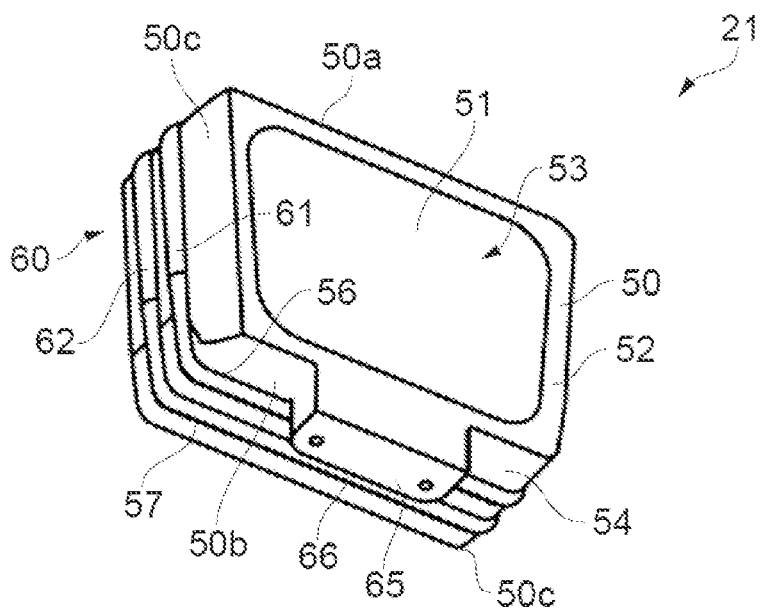
FIG. 5 is a perspective view of the bulkhead of a duct stringer assembly.
Figure 6:
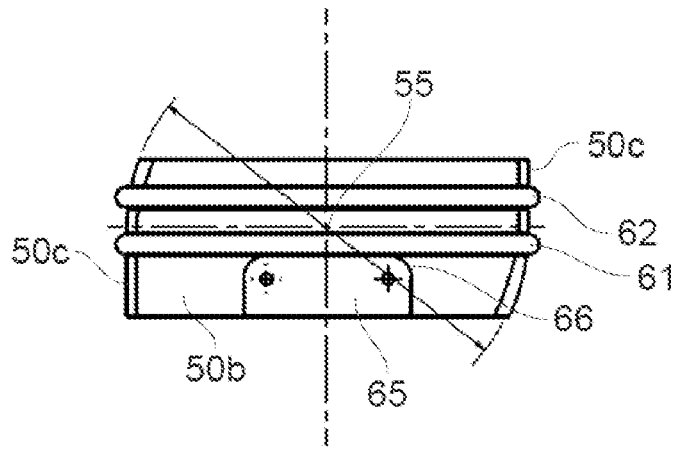
FIG. 6 is a plan view of the bulkhead of FIG. 5.
Figure 7:
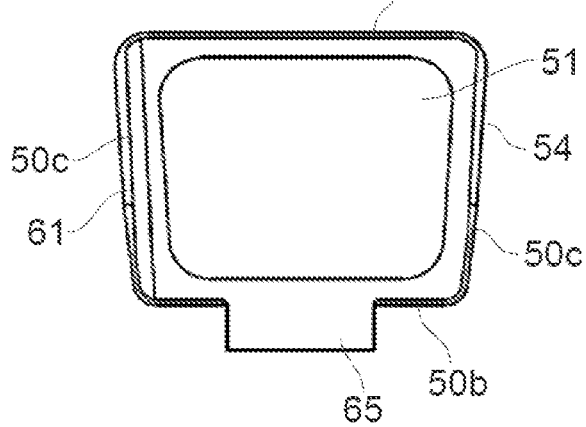
FIG. 7 is a front view of the bulkhead of FIG. 5.

FIG. 3 is a perspective view of part of one of the duct stringer assemblies 27 with the duct stringer 20 and the bulkhead 21. FIG. 4 is a transverse cross-sectional view of the duct stringer 20, bulkhead 21 and the upper wing skin 46 which carries it. The other duct stringer 30 has an identical construction so will not be described in detail. The duct stringer 20 comprises a structural member 25 with a hat-shaped cross-section, a duct member 26 with a closed trapezoidal cross-section; and a pair of noodles (not shown). The structural member 25 has a crown 40, a pair of webs 41 and a pair of feet 42. The crown 40, webs 41 and feet 42 are formed as a single laminar composite part, with plies of the composite material running from one foot 42 to the other via the webs 41 and the crown 40. The duct member 26 is adhered to the crown 40 and to the opposed inner faces of the webs 41 by respective co-cured joints. The duct member 26 and the feet 42 of the structural member are adhered to the upper wing skin 46 by co-cured joints. The duct member 26 provides duct walls which fully enclose a duct 45 with a closed trapezoidal cross-section which is adapted to transport air between the tanks 12, 13.

The bulkhead 21 divides the duct into a first portion 45a on a first side of the bulkhead and a second portion 45b on a second side of the bulkhead as shown in FIG. 4. The first portion 45a of the duct (which runs along the duct portion 20a shown in FIG. 2) is adapted to transport air; and the second portion 45b of the duct (which runs along the structural portion 20b shown in FIG. 2) is not adapted to transport air so may optionally be blocked at its inboard end.

A vent opening 47 is formed in the duct stringer 20. The vent opening 47 is formed in the crown 40. The interconnecting pipe 22 is connected to the first portion 45a of the duct 45 by the vent opening 47. The vent opening 47 is formed by cutting a hole in the crown 40, and a downpipe fitting (not shown) is attached to connect the interconnecting pipe 22.

The vent opening 47 has a vent opening edge 48. The vent opening 47 is elongate and has a generally rectangular profile. The vent opening edge 48 has end portions 49a and side portions 49b. One or both of the end portions 49a of the vent opening edge 48 may be arcuate. A recess 49c is formed in a first end portion 49a, but may be omitted.

FIGS. 4 through 7 show the structure of the bulkhead 21. The bulkhead 21 comprises bulkhead body 50. The bulkhead body 50 comprises a panel section 51 and a flange 52. The flange 52 extends circumferentially about the panel section 51. The bulkhead body 50 defines a pair of opposing cavities 53 on opposing front and rear sides of the bulkhead 21. The bulkhead body 50 has a circumferentially extending surface 54. The bulkhead body 50 has an upper side 50a, a lower side 50b and two opposing sides 50c. The bulkhead body 50 has a profile substantially corresponding to the closed trapezoidal cross-section of the duct 45. The flange 52 has opposing flange portions 52a, 52b extending from front and rear sides of the panel section 51.

The bulkhead body 50 is formed from a fiber reinforced material, for example a fiber reinforced thermoplastic such as polyamide. The bulkhead body 50 may be injection moulded. Alternatively, the bulkhead body 50 is formed from a metallic material, for example an aluminium alloy.

Each of the two opposing sides 50c has a chamfer. One of the two opposing sides 50c is arcuate about a front edge and the other of the two opposing sides 50c is arcuate about a rear edge. That is the chamfers extend in opposing directions. The chamfered sides 50c are arced about a co-axial central axis 55. A planar section of each side extends from the chamfer.

The bulkhead 21 has a mechanical sealing configuration 60. The mechanical sealing configuration 60 comprises a pair of seals, such as o-rings 61, 62. Each o-ring 61, 62 acts as a gasket. The number of o-rings 61, 62 may vary and may be a single o-ring. The cross-section of each o-ring 61, 62 is circular, however a different shape may be used such as a quadrax or D shape.

The o-rings 61, 62 extend circumferentially around the bulkhead body 50. A pair of circumferentially extending channels 56, 57 extend about the bulkhead body 50 to each receive one of the o-rings 61, 62. Each channel 56, 57 is formed in the circumferentially extending surface 54; and is spaced from edges of the circumferentially extending surface 54. The o-rings 61, 62 protrude from the channels 56, 57. That is, the o-rings 61, 62 protrude from the bulkhead body 50 about the circumferential extend of the body 50.

The bulkhead 21 comprises a shoulder 65. The shoulder 65 protrudes from the bulkhead body 50. The shoulder 65 is configured to abut the vent opening edge 48. The shoulder 65 is configured to locate against the vent opening edge 48 at the first end portion 49a. The shoulder 65 is configured to align with and be received by the recess 49c at the first end portion 49a when the bulkhead body 50 is in the duct 45. The shoulder 65 has a locating face 66. The locating face 66 of the shoulder 65 faces the o-rings 61, 62. The shoulder 65 protrudes from the lower side 50b.

When the bulkhead 21 is assembled with the duct stringer 20, the bulkhead body 50 is received in the duct 45. The bulkhead body 50 is disposed perpendicular with the axis of the duct 45. The circumferentially extending surface 54 of the bulkhead body 50 is aligned with the duct walls. The extending surface 54 of the bulkhead body 50 is disposed proximate to, but spaced from, the duct walls to accommodate tolerance build-ups during manufacture. The o-rings 61, 62 acting as gaskets are compressed between the duct walls and the bulkhead body 50. The o-rings 61, 62 seal the gap between the duct walls and the bulkhead body 50. As such, fluid flow past the bulkhead is prevented.

The shoulder 65 locates the bulkhead 21 in the duct 45. The locating face 66 of the shoulder 65 conforms with the end portion 49a of the vent opening edge 48 to ensure that the bulkhead 21 is correctly aligned in the duct 45. The shoulder 65 aids alignment about the axial direction of the duct 45, and also ensures alignment along the duct. The shoulder abutting at the edge 48 of the vent opening 47 ensures that the duct portion 20a ends at the vent opening 47.

Fasteners 67 (refer to FIG. 10) are mounted through the duct walls to fixedly engage with the bulkhead 21. The fasteners 67 may be received in preformed holes in the bulkhead body 50 or may be drilled and inserted following assembly. The fasteners 67 may be threaded fasteners. Fasteners 67, in the present embodiment, are removable to allow ease of maintenance. In another embodiment, a bridge connector fitting (not shown) is used to connect the duct 45 with the interconnecting pipe 22. The bridge connector fitting (not shown) interfaces with the shoulder 65 to mount the shoulder, for example by clamping, and to ensure that the shoulder 65 is retaining in position with the edge 48. As such, the bulkhead 21 is mounted.

Figure 8:
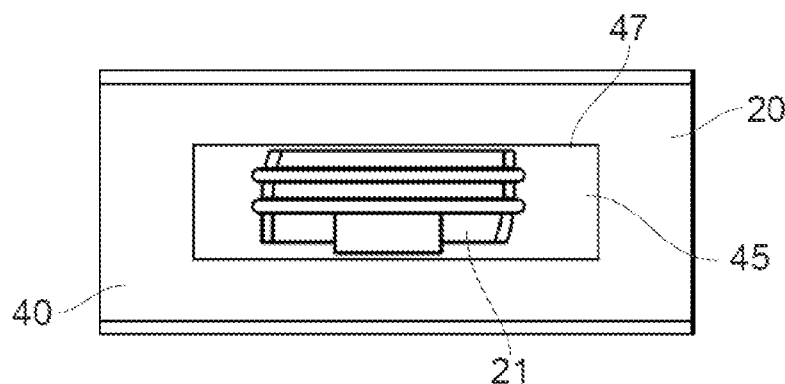
FIGS. 8, 9 and 10 schematically show a method of assembly of a bulkhead and a duct stringer.
Figure 9:
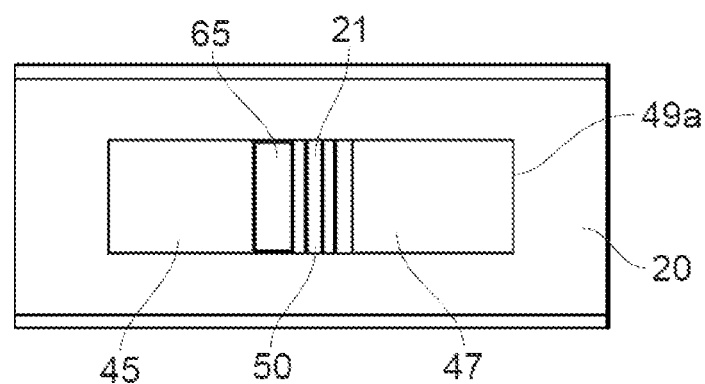
Figure 10:
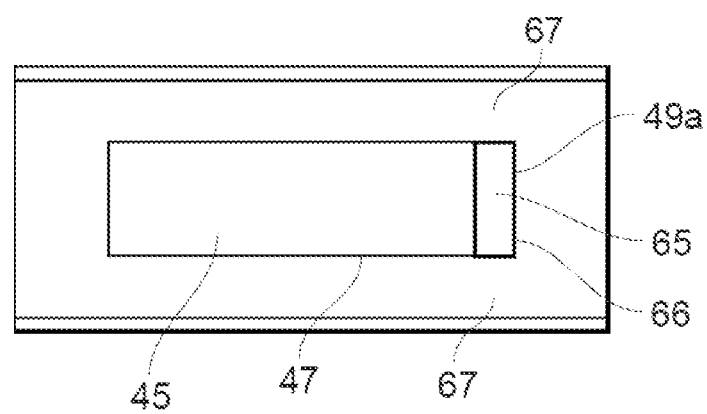
Figure 11:
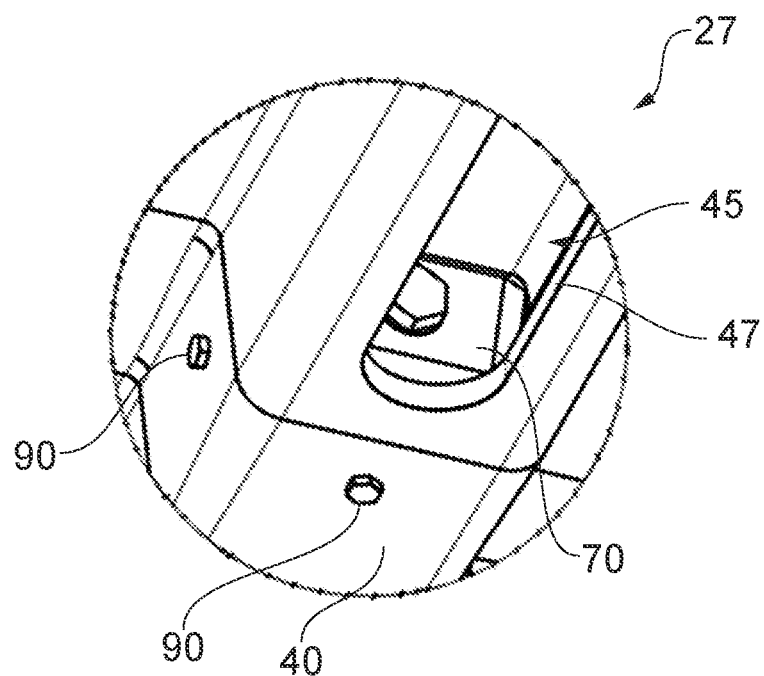
FIG. 11 is a perspective view of part of one of the duct stringer assemblies with the duct stringer and a different bulkhead.
Figure 12:
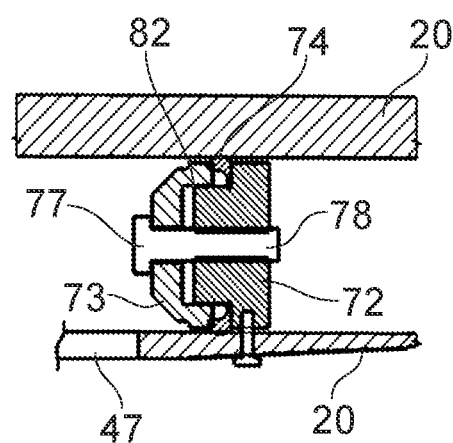
FIG. 12 is a transverse cross-sectional view across one of the duct stringer assemblies.
Figure 13:
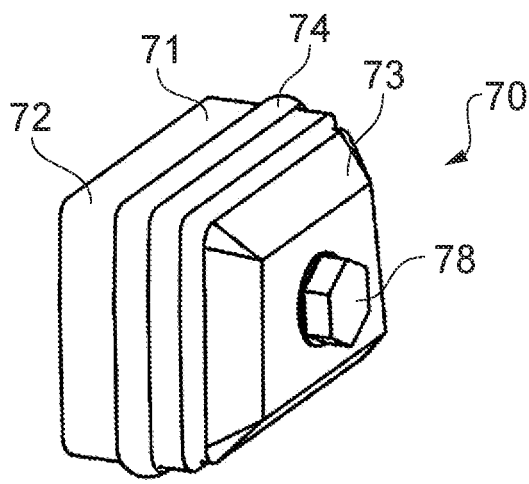
FIG. 13 is a perspective view of the bulkhead of FIG. 11.
Figure 14:
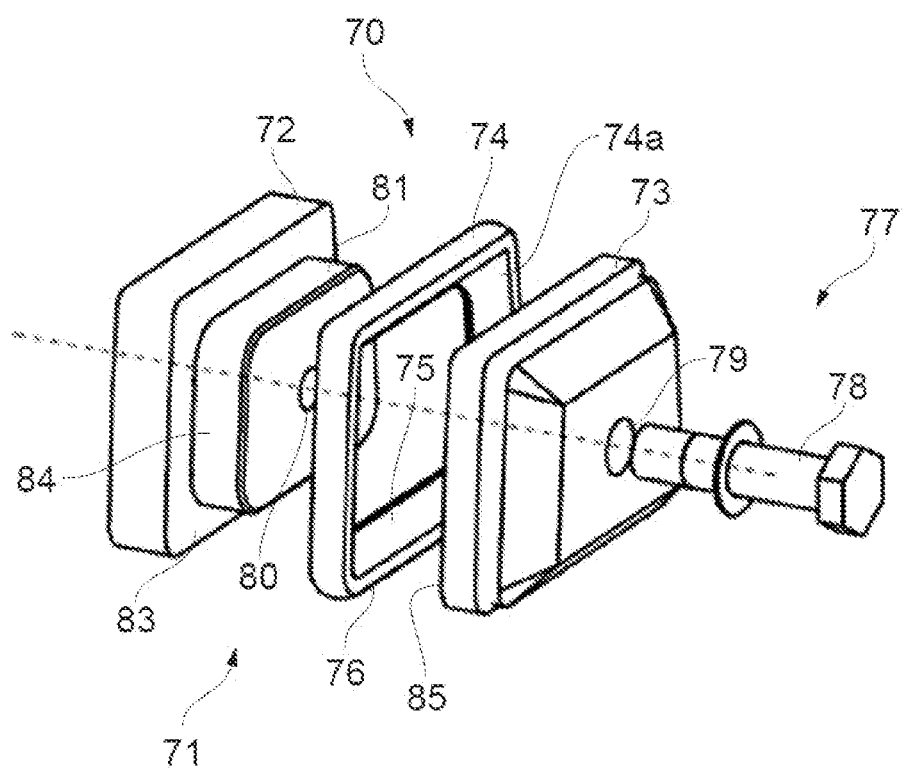
FIG. 14 is an exploded perspective view of the bulkhead shown in FIG. 13.

Assembly of the bulkhead 21 with the duct stringer 20 will now be described with reference to FIGS. 8 to 10. The duct stringer 20 is formed. The bulkhead 21 is inserted through the vent opening 47 in the crown 40 of the duct stringer 20. The vent opening 47 is elongate and extends along the axis of the duct 45. The bulkhead 21 is insertable into the duct 45 perpendicular to its intended orientation. Upon insertion as shown in FIG. 8, the bulkhead is received in the duct 45 and rotated by approximately 90 degrees as shown in FIG. 9. As the bulkhead 21 is rotated, the o-rings 56, 57 are compressed between the bulkhead body 50 and the duct walls. The rotation of the bulkhead 21 is aided by the chamfers on the bulkhead body 50 with their center at the geometrical center of the bulkhead body 50 to restrict contact between the bulkhead body 50 and the duct walls.

The bulkhead 21 is then urged along the duct 45 to the end of the vent opening 47. The shoulder 65 abuts the edge 48 and locates at the first end portion 49a. The bulkhead 21 is then fixed in place as described above. The shoulder may be omitted, and in some embodiments the bulkhead 21 is aligned with preformed holes, for example, to fix the bulkhead in position.

Another embodiment of the duct stringer assembly 27 is shown in FIGS. 11 to 14. This duct stringer assembly 27 is generally the same as the embodiments of duct stringer described above, however, in this embodiment an alternative bulkhead 70 is provided. As such, a detailed description will be omitted. This alternative bulkhead 70 comprises a bulkhead body 71 with first and second portions 72, 73. The first and second portions 72, 73 are manipulable to clamp an o-ring 74, acting as a gasket, therebetween. The first and second portions 72, 73 act to clamp at least an inner side 75 of the o-ring 74 to cause the o-ring 74, and in particular an outer side 76, to distend outwardly. The o-ring is a resilient material and may take another form. The o-ring 74 is formed from an elastomeric material, for example.

The first portion 72 comprises a male part 81 which is received in a female part 82 of the second portion 73. The male part 81 is slidable in the female part 82. The first portion 72 has a circumferentially extending step 83 such that the male part 81 forms a seat 84 on which the o-ring 74 is received. When the first and second portions 72, 73 are brought together the o-ring 74 is disposed between the step 83 and a clamping face 85 of the second portion 73. The o-ring 74 has a profiled face 74a. The profiled face 74a extends circumferentially. The profiled face 74a abuts the clamping face 85 to aid the o-ring being urged outwardly. In another embodiment, the o-ring 74 has a profiled face against which the first portion 72 acts.

The bulkhead body 71 comprises an axial clamping mechanism 77 arranged to draw the first and second portions 72, 73 towards each other. The axial clamping mechanism 77 comprises a threaded fastener 78 which extends through a bore 79 in the first portion 72 and engages with a threaded hole 80 in the second portion 73. The second portion 73 may include an engaging part. The configuration of the axial clamping mechanism 77 may be reversed and may have an alternative arrangement. Upon rotation of the threaded fastener 78, the first and second portions 72, 73 are urged together and act on the o-ring 74. The first and second portions 72 cause the resilient member forming the o-ring 74 to distend and urge the o-ring to distend outwardly as the o-ring 74 is compressed. The distension of the o-ring 74 is maintained by the compressive force of the axial clamping mechanism 77.

Upon assembly, the bulkhead 70 is inserted through the vent opening 47. The bulkhead 70 is inserted perpendicular to its assembled location to enable insertion through the preformed aperture acting as the vent opening 47. The bulkhead body 71 is initially in a non-compressed configuration so that the o-ring 74 acting as a gasket is not distended outwardly. This provides a relatively large clearance between the bulkhead 70 and the duct walls. The bulkhead 70 is rotated through approximately 90 degrees and maneuvered into a predetermined position. The axial clamping mechanism 77 is then operated by a tool (not shown). The clamping force exerted causes the o-ring to deform and distend outwardly. The o-ring 74 is brought into contact with the duct walls and seals against the duct walls. As such, the o-ring acting as a gasket is compressed between the bulkhead body 71 and the duct walls. The o-ring 74 extends circumferentially about the bulkhead body 71 to seal the circumferentially extending gap. Fasteners 90 are used to fix the bulkhead in position, for example by bolts extending through the duct wall into the bulkhead body 71. Alternative fixing structures may be used as described above.

Although in the embodiment shown in FIGS. 11 through 15, the bulkhead is located without a shoulder which locates against the edge 48 of the vent opening 47, in embodiments the shoulder is provided. Such an arrangement may be used in conjunction with or without fasteners 90.

Where the word 'or' appears this is to be construed to mean 'and/or' such that items referred to are not necessarily mutually exclusive and may be used in any appropriate combination.

Although the disclosure herein has been described above with reference to one or more preferred embodiments, it will be appreciated that various changes or modifications may be made without departing from the scope of the disclosure herein as defined in the appended claims.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft duct stringer assembly comprising:
a duct stringer comprising a structural member and a duct member, wherein:
the structural member has a hat-shaped cross-section, which comprises a crown, a pair of webs, and a pair of feet;
the duct member provides duct walls that fully enclose a duct with a closed cross-section, wherein the duct is configured to transport fluid;
a vent opening is formed in the duct member, wherein the vent opening is formed only in the crown of the structural member and in the duct wall of the duct member that is against the crown of the structural member, and
wherein the vent opening has a vent opening edge; and
a bulkhead in a portion of the duct member, in which the duct is fully enclosed by the duct walls, the bulkhead comprising:
a bulkhead body;
a shoulder that protrudes from the bulkhead body; and
a gasket sealing a gap between the bulkhead body and the duct walls;
wherein the bulkhead body is insertable through the vent opening formed in the crown of the structural member and into the duct;
wherein a plurality of fasteners are mounted through the duct walls to fixedly engage with the bulkhead;
wherein, when the bulkhead is within the duct, the shoulder is configured to abut the vent opening edge at a first end portion of the vent opening edge to locate the bulkhead body, from which the shoulder protrudes, at the first end portion of the vent opening edge; and
wherein, when the bulkhead is within the duct, the bulkhead is configured to block a flow of fluid along the duct.

2. The duct stringer assembly of claim 1, comprising a releasable mechanical fixing between the bulkhead body and the duct walls.

3. The duct stringer assembly of claim 2, wherein:
the releasable mechanical fixing comprises a plurality of fasteners; or
the gasket comprises an o-ring.

4. The duct stringer assembly of claim 1, wherein the gasket is a first gasket and the bulkhead comprises a second gasket.

5. The duct stringer assembly of claim 1, wherein the bulkhead body comprises a circumferentially extending surface, a section of the gasket protruding from the circumferentially extending surface.

6. The duct stringer assembly of claim 5, wherein the bulkhead body comprises two opposing sides of the circumferentially extending surface which are chamfered in opposing directions.

7. The duct stringer assembly of claim 5, wherein the bulkhead body comprises a circumferentially extending flange forming the circumferentially extending surface.

8. The duct stringer assembly of claim 1, wherein:
the bulkhead body comprises a first portion and a second portion; and
at least an inner side of the gasket is at least partially received between the first and second portions.

9. The duct stringer assembly of claim 8, wherein at least the inner side of the gasket is compressed to cause an outer side of the gasket to be distended away from the bulkhead body.

10. The duct stringer assembly of claim 8, comprising an axial clamping mechanism arranged to clamp the gasket between the first and second portions.

11. The duct stringer assembly of claim 1 further comprising a skin, wherein the duct member is adhered to the skin.

12. An aircraft comprising the duct stringer assembly according to claim 1.

13. The duct stringer assembly of claim 1, wherein:
the duct member has a closed-trapezoidal cross-section; and
the duct walls fully enclose the duct with the closed-trapezoidal cross-section.

14. A method of assembling an aircraft duct stringer assembly, the method comprising:
providing a duct stringer comprising a structural member and a duct member, wherein:
the structural member has a hat-shaped cross-section, which comprises a crown, a pair of webs, and a pair of feet;
the duct member provides duct walls that fully enclose a duct with a closed cross-section, the duct being for transporting fluid;
forming a vent opening in the duct member, wherein the vent opening is formed only in the crown of the structural member and in the duct wall of the duct member that is against the crown of the structural member, and wherein the vent opening has a vent opening edge; and
after the vent opening has been formed, inserting a bulkhead in a portion of the duct member, in which the duct is fully enclosed by the duct walls, wherein the bulkhead comprises:
a bulkhead body;
a shoulder that protrudes from the bulkhead body; and
a gasket;
wherein the bulkhead body is insertable through the vent opening formed in the crown of the structural member and into the duct;
wherein a plurality of fasteners are mounted through the duct walls to fixedly engage with the bulkhead; and
when the bulkhead is within the duct, abutting the shoulder of the bulkhead against the vent opening edge at a first end portion of the vent opening edge to locate the shoulder, as well as the bulkhead body from which the shoulder protrudes, at the first end portion of the vent opening edge, so the gasket seals a gap between the bulkhead body and the duct walls to block a flow of fluid along the duct.

15. The method of claim 14, wherein:
the duct walls are formed by curing a fiber-reinforced composite material; or
the duct stringer comprises a releasable mechanical fixing between the bulkhead body and the duct walls, the releasable mechanical fixing comprising a plurality of fasteners.

16. The method of claim 14, wherein:
the gasket comprises an o-ring; or
the gasket is a first gasket and the bulkhead comprises a second gasket; or
the bulkhead body comprises a circumferentially extending surface, a section of the gasket protruding from the circumferentially extending surface.

17. The method of claim 16, wherein:

the bulkhead body comprises two opposing sides of the circumferentially extending surface which are chamfered in opposing directions; or the bulkhead body comprises a circumferentially extending flange forming the circumferentially extending surface.

18. The method of claim 14, wherein:

the bulkhead body comprises a first portion and a second portion; and at least an inner side of the gasket is at least partially received between the first and second portions.

19. The method of claim 14, comprising adhering the duct member to a skin of the duct stringer assembly.

20. The method of claim 14, wherein:

the duct member has a closed-trapezoidal cross-section; and the duct walls fully enclose the duct with the closed-trapezoidal cross-section.

* * * * *